(12) United States Patent
Young

(10) Patent No.: US 6,520,301 B2
(45) Date of Patent: Feb. 18, 2003

(54) FRICTION LINING ATTACHMENTS

(75) Inventor: Brett John Young, Wonthaggi (AU)

(73) Assignee: Hi-Lok Pty Ltd., Dandenong (AU)

( * ) Notice: Subject to any disclaimer, the term of this patent is extended or adjusted under 35 U.S.C. 154(b) by 0 days.

(21) Appl. No.: 09/799,311

(22) Filed: Mar. 5, 2001

(65) Prior Publication Data

US 2002/0121412 A1 Sep. 5, 2002

Related U.S. Application Data

(63) Continuation-in-part of application No. 09/331,009, filed as application No. PCT/AU97/00857 on Dec. 18, 1997.

(30) Foreign Application Priority Data

Dec. 18, 1996 (AU) .............................................. PO4262

(51) Int. Cl.⁷ .............................................. F16D 69/00
(52) U.S. Cl. .............................. 188/250 G; 188/250 A; 188/234
(58) Field of Search ......................... 188/250 G, 250 B, 188/250 A, 250 R, 250 E, 250 F, 218 A, 218 XL, 234, 218 R, 258, 242, 247, 248, 73.32

(56) References Cited

U.S. PATENT DOCUMENTS

| | | | |
|---|---|---|---|
| 1,917,820 A | 7/1933 | Brackett | |
| 2,067,677 A | 1/1937 | Murphy | |
| 2,541,978 A | * 2/1951 | Amundsen | ................... 188/245 |
| 2,541,979 A | * 2/1951 | Amundsen | ................... 188/245 |
| 2,879,866 A | 3/1959 | Newell | ....................... 188/234 |
| 3,042,152 A | 7/1962 | Butler | |
| 5,255,762 A | 10/1993 | Beri | |

FOREIGN PATENT DOCUMENTS

GB  623021  5/1949

* cited by examiner

Primary Examiner—Pam Rodriguez
(74) Attorney, Agent, or Firm—Burr & Brown

(57) ABSTRACT

An attachment between segments (12) of a friction lining material and a brake shoe (11), in which the lining (12) is attached to the brake shoe (11) by a plurality of keying elements (16) attached by screws (17) to the brake shoe (11), and cooperating with a plurality of associated grooves (18) in the lining (12) in such a manner as to prevent the lining (12) from becoming detached from the brake shoe (11). The keying elements (16) being retained within their associated grooves (18) whereby there will be no, or a limited amount of, relative movement between the lining (12) and the brake shoe (11) in any direction.

11 Claims, 3 Drawing Sheets

FRICTION LINING ATTACHMENTS

CROSS REFERENCE TO RELATED APPLICATION

This application is a continuation-in-part of U.S. patent application Ser. No. 09/331,009, filed Jun. 15, 1999, now abandoned, which was the National Stage of International Application No. PCT/AU97/00857 having an international filing date of Dec. 18, 1997, published in English on Jun. 25, 1998 under PCT Article 21(2).

TECHNICAL FIELD

This invention relates to the attachment of friction linings to backing plates, as may be utilised in vehicle or other machine braking systems, clutch mechanisms, or other mechanisms where friction linings are to be attached to a backing plate.

For the purposes of this specification reference will be made mainly to the attachment of friction lining segments to sole plates of brake shoes for vehicles, particularly heavy duty vehicles such as trucks and buses which because of their weight and the terrain in which they may be required to operate, must have secure attachment of the friction linings on the brake shoes to avoid brake malfunction and the consequences resulting therefrom. The invention is also applicable to other vehicles such as cars, motorcycles, trains and aeroplane braking systems, and clutch mechanisms where applicable, as well as other machinery where brake or clutch mechanisms may be necessary, including elevators.

BACKGROUND OF THE INVENTION

Conventional attachments between friction linings and braking plates, such as between brake linings and sole plates in brake shoes, have involved the use of rivets coupling the linings to the backing plates. The heads of the rivets on the lining side of the attachment are received in recessed holes, and maintain attachment until such time as the friction linings wear away to an extent that the rivet heads and an associated braking surface, such as a surface of a brake drum or brake disc, become sufficiently close as to require replacement of the friction linings. One well known problem with such attachments is that there is a build up of grit in the recesses for the rivets which as a result of the rubbing action of the linings against the associated braking surface causes scouring or other damage to the braking surface requiring machining maintenance from time to time to repair the damage to the brake drum or disc. In addition, in order to securely attach the linings to the backing plates (sole plates) a considerable number of rivets may be required which adds to the expense, both in parts and labour, in manufacturing and maintaining the brake, clutch or equivalent component.

An alternative attachment is also known using direct bonding of the linings to the backing plates without the necessity for rivets and using hot or cold bonding agents which because of the advances in bonding agent technology have allowed for reliable attachment in most instances. However, in some heavy duty applications, such as braking systems for trucks, and more particularly buses where safety factors are more critical, there are perceived problems in relation to detachment of the friction linings (brake linings) from the backing plates (brake soles) and although brake failures resulting from such detachments are very rare, there is some concern on the part of truck and bus operators to utilising bonded brake linings in such severe service applications. The likely main cause of brake malfunction with bonding techniques is that as a brake lining becomes worn, and as a result thinner, heat generated during braking operations is more rapidly conducted to the interface between the lining and the backing plate whereby the hot or cold bonding agent can be adversely affected to the extent that its bonding action breaks down and the lining separates from the backing plate.

In the past it has been proposed to provide an attachment between a friction lining and a backing plate, in which the lining is keyed to the backing plate by one or more keying elements attached to the backing plate and cooperating with one or more associated grooves in the lining in such a manner as to prevent the lining from being detached from the backing plate.

One such attachment is disclosed in Australian patent specification no. 149358 entitled "improvements in or relating to a clutch of brake mechanism". However, such proposals have involved the use of keying elements which extend completely across the backing plate, as do the associated grooves in the lining, thus leading to the possibility that the lining may move laterally of, or even off, the backing plate under certain circumstances.

It is therefore an object of the present invention to provide an attachment between a friction lining and backing plate which eliminates, or at least minimises, the above problems with known riveted, bonded, or keyed and groove attachments, and in particular with regard to the latter any possibility that there will be relative lateral movement to any large extent between the lining and the backing plate.

SUMMARY OF THE INVENTION

In accordance with the present invention there is provided an attachment between a friction lining and a backing plate, in which the lining is keyed to the backing plate by a plurality of keying elements attached to the backing plate and cooperating with a plurality of associated recesses in the lining in such a manner as to prevent the lining from becoming detached from the backing plate, and wherein at least one of the keying elements and its associated recess is such that one side or end thereof terminates within the lining material laterally of the lining, whereby there will be no, or a limited amount of, relative lateral movement between the lining and backing plate.

In one embodiment at least some of the keying elements are elongate and received in correspondingly elongate grooves and at least one of those keying elements and associated groove extends only partially across the interface between the backing plate and friction lining from one side thereof, and at least one other of those keying elements and associated groove also extends only partially across the interface from the other side thereof.

In another embodiment at least some of the keying elements are suitable shaped elements received in recesses residing totally within the lining material.

Preferably the keying elements are attached to the backing plate by screws, bolts or rivets extending through apertures in the backing plates and into the keying elements after the lining has been positioned on the backing plate.

Alternatively the keying elements may be attached by bonding or gluing them within the respective recesses.

In a still further alternative embodiment the attachment may be formed by a combination of screws, bolts or rivets and bonding or gluing.

In a still further alternative embodiment the keying elements may be moulded into the lining material at the time of moulding of the linings.

Possibly a bonding agent may also be provided between the lining and the backing plate to enhance the attachment of the lining to the plate.

The invention also envisages a friction lining having at least one keying element.

The invention also envisages a friction lining with at least one recess and a keying element for association therewith.

BRIEF DESCRIPTION OF THE DRAWINGS

Two preferred embodiments of the invention, and several variations thereof, will now be described with reference to the accompanying drawings, in which.

DETAILED DESCRIPTION OF THE INVENTION

Figure 1:
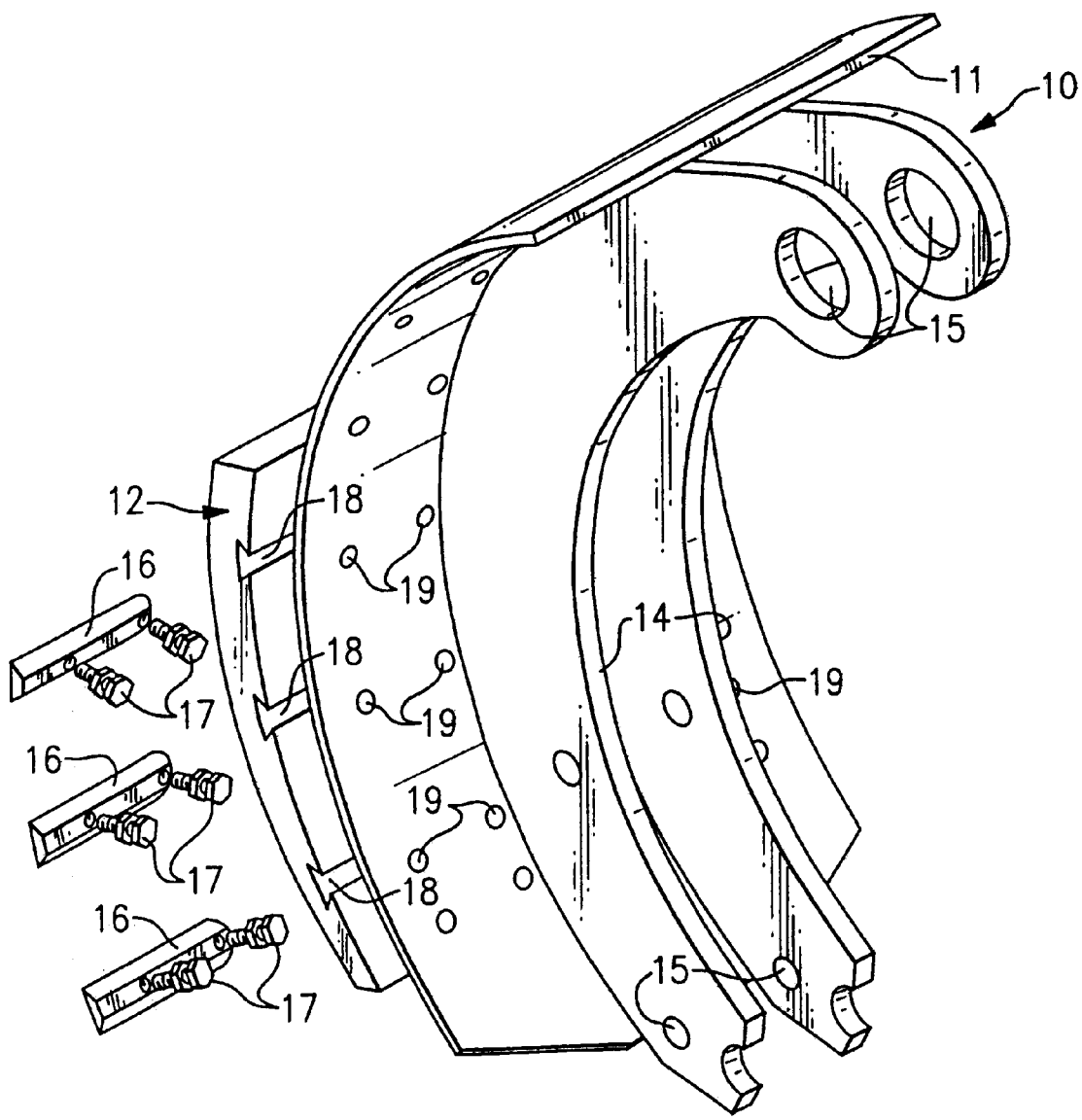
FIG. 1 is a perspective view from beneath of a brake shoe incorporating the first embodiment of the present invention
Figure 2:
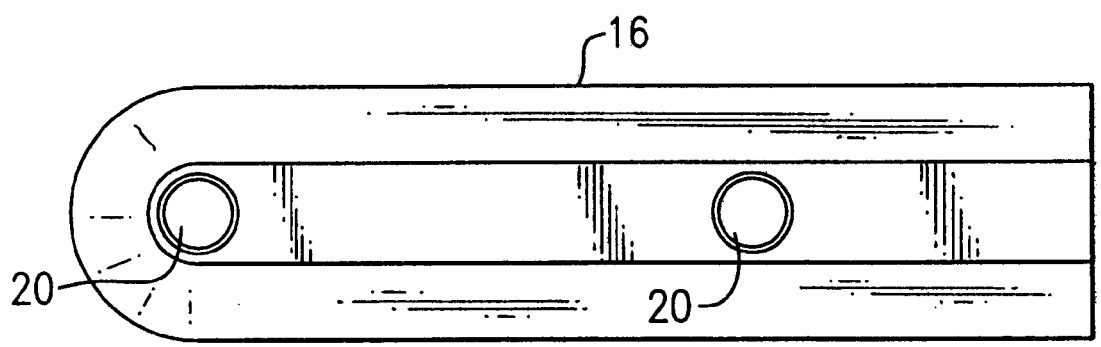
FIG. 2 is a plan view from above of a keying element used in the preferred embodiment of FIG. 1.
Figure 3:
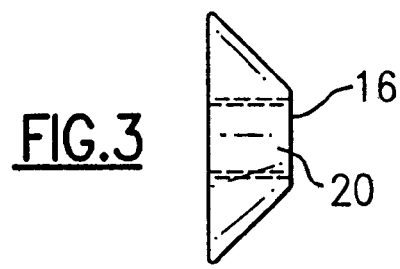
FIG. 3 is an end elevational view of the keying element of FIG. 2.
Figure 4:
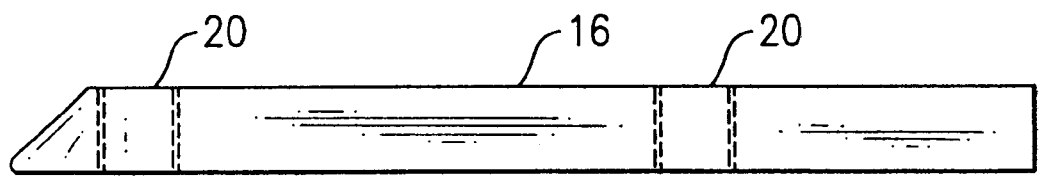
FIG. 4 is a side elevational view of the keying element of FIG. 2

These preferred embodiments of the invention relate to a brake shoe for a vehicle, which shoe is of arcuate configuration to cooperate with the internal braking surface of a cylindrical brake drum.

In the first preferred embodiment the brake shoe, designated as 10, comprises an arcuately shaped elongate brake sole 11 to which are applied, in this case a pair of (only one shown), arcuately shaped brake lining segments 12. The radially inner side of the brake shoe 11 carries a pair of shoe webs 14 extending along the length and beyond the ends of the brake sole, and spaced apart in parallel relationship, and also having apertures 15 therethrough at either end for attachment to associated linkage mechanisms with other brake lining shoes as well as brake actuating mechanisms as is conventional with vehicle braking systems. To this point the brake shoe described is of a conventional type, and to which in past, the brake lining segments are either riveted or bonded to the brake sole as discussed previously.

In accordance with this preferred embodiment of the invention, the use of a plurality of rivets to directly attach respective brake lining segments 12 to the brake shoe, are dispensed with, and instead elongate keying elements 16, in this case six such elements for each lining segment (three on each lateral side thereof), are fastened using two bolts 17 for each element. The keying elements extend partially across the width of the brake sole and cooperate in a keying action with associated grooves 18 formed corresponding partially across the internal side of the respective lining segments. In this preferred embodiment, the keying elements 16 are of wedge shaped configuration tapering inwardly towards the brake sole 11 and the grooves 18 are matingly shaped to in effect prevent detachment of the lining segments from the brake sole. The lining segments are placed in position on the brake sole and the keying elements are then driven into position, whereafter the bolts 17 are inserted through apertures 19 in the brake sole 11 and into threaded engagement with correspondingly threaded holes 20 in the keying elements. As an alternative the holes 20 may be punched or otherwise formed for receiving appropriate fasteners, such as self tapping screws.

Calculations have shown that the area of the cooperating surfaces between the keying elements 16 and the grooves 18 will be significantly higher than that provided by the normal number of rivets used to attach lining segments in conventional lining attachments. The optimum number of keying elements and the means for fastening them, such as bolts 17, will be ultimately determined by the application, physical characteristics of the friction lining and the shear strength of the fastening means.

The present invention resists lateral movement of the lining elements as it involves the use of grooves formed across the internal side of the respective lining segments that only partially extend across the width of the segments, alternately from one side and the other, and the keying elements are inserted from both sides, whereby, apart from preventing movement of the lining elements along the length of the brake sole, the lining segments will also be prevented from moving laterally of the brake sole.

In addition, the attachment between the lining segments 12 and the brake sole may be enhanced by providing a bonding agent (either hot or cold bonding) between the interface between the lining segments and the brake sole.

In this embodiment of the invention, the ends of the keying elements 16 are formed as semi-circular shapes to match the semi-circular internal ends of the associated grooves 18 which would result from a wedge shaped circular milling tool being one of the most convenient ways of forming the wedge shaped grooves 18. Alternatively the inner ends of the keying elements and associated groove may be merely squared as with their outer ends. As such keying elements, because of their shape may need to be forged from, for example high tensile brass, in an alternative embodiment of the invention the majority of the length of the keying elements may be cut from a length of a more conveniently formed extrusion to form elongate rectangular keying elements and if the semi-circular ends thereof are required these could be provided by separately formed moulded plastic parts. The keying elements may alternatively be formed.

The length of the keying elements 16 and associated grooves 18 extending laterally from either side of the brake shoe may vary on either side of the brake shoe and be such that one on one side may overlap the adjacent one on the other side, thus enhancing the resistance against separation of the lining along the length of the brake sole.

Figure 5:
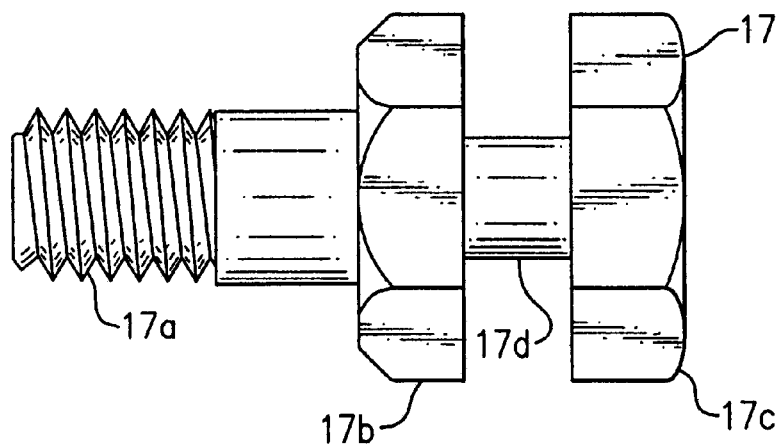
FIG. 5 is a side elevational view of a shear screw/bolt used in this preferred embodiment of the invention.

Turning to FIG. 5 of the drawings, the bolts 17 may be shear bolts having a threaded end 17a an intermediate hexagonal head 17b for engagement by a spanner when the screws are to be removed when detaching a lining segments from a brake sole, and an outer hexagonal head 17c to be engaged by a spanner during attachment of the lining segment to the brake shoe, and separated by a shear portion 17d of reduced diameter calculated to shear if, during tightening of the screw, a predetermined tightening torque is reached and beyond which damage to the lining segment may occur.

Figure 6:
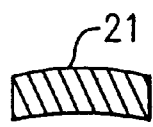
FIG. 6 is a cross-sectional view through a keying element for use in the second embodiment of the invention.
Figure 7:
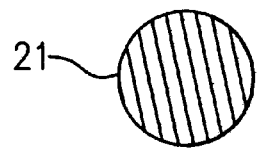
FIG. 7 is a plan view of the keying element of FIG. 6.
Figure 8:
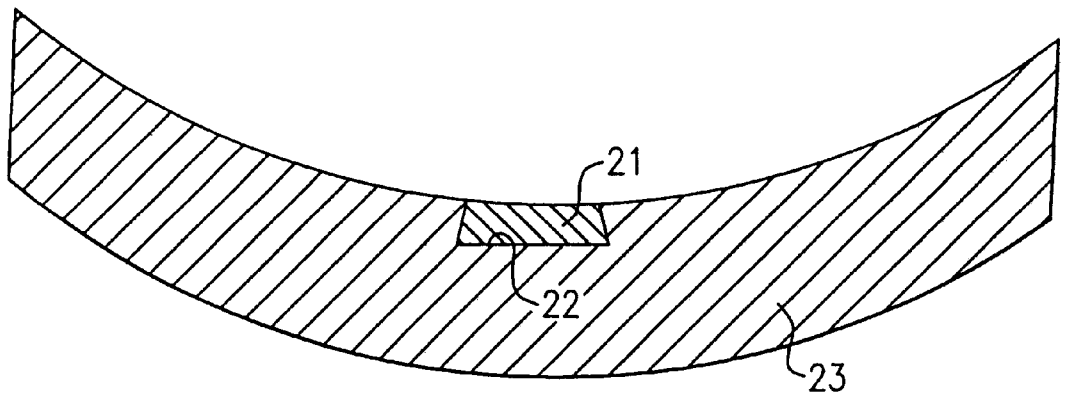
FIG. 8 is a cross-sectional view of a lining having the keying elements of FIGS. 6 and 7 received in recesses in the lining.

Referring to FIGS. 6, 7 and 8 of the drawings, in a second preferred embodiment of the invention the keying elements are circular button shaped elements or buttons 21 punched from suitable metal section such as steel or metal alloys, for example brass, using a punch which will form the button into a concave shape as shown in FIG. 6. The degree of concavity may be varied depending on the particular application.

The buttons 21 are thereafter inserted into recesses 22 provided in the lining material 23 and of inwardly and outwardly tapering configuration as shown in FIG. 8, with the buttons being pressed flat within the recesses whereby, because of their original concavity, its innermost side is caused to flare or splay outwardly to allow an interference fit, or firm wedging of the buttons within the recesses. The buttons 21 may be formed with a splined or knurled edge or circumference to increase their grip on the friction material within the recesses.

The diameter and thickness of the buttons may vary depending on the particular application, as may the metals from which they are formed, whilst apart from punch forming, the buttons may be machined or moulded to the required shape.

Either before or after the buttons are pressed into the recesses, they may have holes drilled, punched or otherwise formed therein to receive self-tapping screws to attach them to a brake sole via a hole through the brake sole. The attachment may alternatively be achieved by drilled and threaded holes to receive bolts or resistant welded studs or special pop or cherry type rivets. The holes may be formed during punching, machining or moulding of the button.

The buttons or keying elements may be of other shapes, such as square, rectangular, hexagonal or other polygonal shapes and may be suitable knurled, splined or otherwise formed to increase their grip on the friction material.

As an alternative to interference fitting or wedging of the buttons in their respective recesses they may be bonded or glued into position, or a combination of both screws, bolts or rivets and bonding or gluing. In a still further alternative the buttons may be moulded into the material of the friction lining when the lining is moulded.

The buttons or keying elements of any of the above embodiments may be formed from steel, metal alloys, plastics or other suitable composites.

In some applications circular recesses or longitudinal grooves having perpendicular walls may be suitable and friction engagement, without a wedging action, may be sufficient to achieve engagement of the keying elements within the recesses or grooves of any of the above embodiments when the keying elements are pressed into their respective recesses or grooves.

Since modifications within the spirit and scope of the invention may readily be effected by persons skilled within the art, it is to be understood that this invention is not limited to the particular embodiments described by way of examples hereinabove.

What is claimed is:

1. An attachment between a friction lining material and a backing plate, in which the lining is attached to the backing plate by a plurality of keying elements attached to the backing plate and cooperating with a plurality of associated recesses in the lining in such a manner as to prevent the lining from becoming detached from the backing plate, said recesses being formed in the face of the lining abutting said backing plate and terminating short of the other face of the lining, wherein the wall of at least one recess completely surrounds and is engaged by its associated keying element and/or at least two recesses extend from opposite edges of the lining and partially across the lining with the inner ends of the recesses forming abutments against which their associated keying elements engage, and whereby in either case there will be no, or a limited amount of, relative movement between the lining and the backing plate in any direction.

2. An attachment as claimed in claim 1, wherein some of the peripheral edges of the keying element are designed so as to be of a wedge shape and the edges of their associated recesses are correspondingly shaped.

3. An attachment as claimed in claim 2, wherein at least one of said keying elements is elongate and received in a correspondingly elongate groove which extends only partially across the interface between the backing plate and the friction lining from one side thereof and opening through that side, and at least one other of said keying elements and associated groove also extend only partially across the interface from the other side thereof and opening through that side.

4. An attachment as claimed in claim 2, wherein at least one of said keying elements is a suitably shaped element received in a recess totally residing within the friction lining material.

5. An attachment as claimed in claim 1, wherein at least one of said keying elements is elongate and received in a correspondingly elongate groove which extends only partially across the interface between the backing plate and the friction lining from one side thereof and opening through that side, and at least one other of said keying elements and associated groove also extend only partially across the interface from the other side thereof and opening through that side.

6. An attachment as claimed in claim 1, wherein at least one of said keying elements is a suitably shaped element received in a recess totally residing within the friction lining material.

7. An attachment as claimed in claim 1, wherein the keying elements are attached to the backing plate by screws, bolts or rivets extending through apertures in the backing plate and into the keying element.

8. An attachment as claimed in claim 7, wherein the keying elements are also bonded or glued within the respective recesses.

9. An attachment as claimed in claim 1, wherein the keying elements are moulded into the lining material during moulding of the shape of the lining material.

10. An attachment as claimed in claim 1, wherein a bonding agent is also provided between the lining material and the backing plate.

11. The combination of a friction lining having at least one recess and a keying element for association therewith as claimed in claim 1.

* * * * *